United States Patent [19]
Goldstein

[11] Patent Number: 5,596,314
[45] Date of Patent: Jan. 21, 1997

[54] ENCLOSURE FOR A GAS DETECTOR SYSTEM

[75] Inventor: Mark K. Goldstein, San Diego, Calif.

[73] Assignee: Quantum Group, Inc., San Diego, Calif.

[21] Appl. No.: 283,550

[22] Filed: Aug. 1, 1994

[51] Int. Cl.⁶ .................................... G08B 17/10
[52] U.S. Cl. ................... 340/632; 340/628; 340/693; 429/96; 429/100
[58] Field of Search .................... 340/628, 632, 340/633, 634, 629, 630, 693; 220/521, 522, 254, 293; 429/96, 97, 98, 99, 100

[56] References Cited

U.S. PATENT DOCUMENTS

| | | | |
|---|---|---|---|
| Re. 30,323 | 7/1980 | Tomioka | 250/385 |
| 2,549,974 | 5/1949 | Klug | 23/255 |
| 2,553,179 | 5/1951 | Farr | 23/255 |
| 3,027,552 | 3/1962 | Landis | 340/237 |
| 4,043,934 | 8/1977 | Schuler et al. | 436/134 X |
| 4,090,177 | 5/1978 | Urata et al. | 340/630 X |
| 4,144,032 | 3/1979 | Davis | 436/168 X |
| 4,152,551 | 5/1979 | Hiller | 381/69 |
| 4,181,439 | 1/1980 | Tresch et al. | 340/630 X |
| 4,228,428 | 10/1980 | Niedermeyer | 340/628 |
| 4,316,184 | 2/1982 | Nagel | 340/630 X |
| 4,319,234 | 3/1982 | Rice | 340/693 |
| 4,401,978 | 8/1983 | Soloman | 340/630 X |
| 4,769,550 | 9/1988 | Dolnick | 250/574 |
| 4,839,014 | 6/1989 | Park et al. | 340/632 |
| 4,845,474 | 7/1989 | Moore et al. | 340/629 |
| 4,870,395 | 9/1989 | Belano | 340/693 |
| 4,959,640 | 9/1990 | Hall | 340/693 |
| 5,063,164 | 11/1991 | Goldstein | 436/169 |
| 5,103,216 | 4/1992 | Sisselman | 340/693 |
| 5,172,042 | 12/1992 | Singhal | 429/96 |
| 5,280,273 | 1/1994 | Goldstein | 340/632 |
| 5,290,639 | 3/1994 | Mallory | 429/1 |
| 5,302,350 | 4/1994 | Goswami et al. | 422/86 |
| 5,327,119 | 7/1994 | Ishii | 340/628 |
| 5,346,671 | 9/1994 | Goswami et al. | 422/86 |
| 5,394,094 | 2/1995 | Wagner | 340/632 |
| 5,396,221 | 3/1995 | Bridges | 340/628 |
| 5,404,090 | 4/1995 | Shinbori | 429/99 |
| 5,405,583 | 4/1995 | Goswami et al. | 422/86 |
| 5,445,900 | 8/1995 | Miller, Jr. et al. | 429/97 |
| 5,489,484 | 2/1996 | Wheeler et al. | 429/98 |
| 5,489,485 | 2/1996 | Peot et al. | 429/99 |
| 5,489,486 | 2/1996 | Glover | 429/100 |

FOREIGN PATENT DOCUMENTS

| | | | |
|---|---|---|---|
| 39761 | 11/1981 | European Pat. Off. | 340/630 |
| 2241985 | 9/1991 | United Kingdom | 17/10 |

OTHER PUBLICATIONS

ESP–Alert Carbon Monoxide/Smoke detector.
COSTAR Carbon Monoxide Alarm, Quantum Group Inc.; (no date); cited by applicant as prior art.

*Primary Examiner*—Jeffery Hofsass
*Assistant Examiner*—Ashok Mannava
*Attorney, Agent, or Firm*—Niro, Scavone, Haller & Niro

[57] ABSTRACT

An enclosure for a gas detector including an easily removable and replaceable battery/sensor holder and a battery absence indicator. The enclosure includes a flat first panel adapted to be fastened into a ceiling, a second panel spaced from the first panel to contain the gas detecting apparatus and a sidewall closing between the edges of the panels. A specially configured opening is provided to allow sound from an audio alarm to exit the enclosure. Another opening in the second side panel is configured to receive and retain a battery holder through a cooperating bayonet type arrangement of radial protrusions on the holder and notches in the sides of the opening. A tube is contained in the opening in such a way as to permit the tube to extend when the holder is removed to signal the absence of the holder. The tube is pushed back into the enclosure when the battery/sensor holder is inserted. One or more protrusions may house a gas detection cell so that the cell is automatically inserted between a light emitting means and a light detecting means when the batter/sensor holder is inserted.

16 Claims, 2 Drawing Sheets

ENCLOSURE FOR A GAS DETECTOR SYSTEM

BACKGROUND OF THE INVENTION

This invention relates in general to gas detector systems and more particularly, to an enclosure for such a system, including a battery/gas sensing cell or battery/sensor holder and holder absence indicator.

Airborne gases and vapor, some of which are toxic and others of which are flammable or otherwise dangerous, such as propane, methane, carbon monoxide, mercury, ethylene oxide, volatile organic compounds, hydrogen sulphide, etc. are difficult to detect, especially where they are odorless or present at levels that cannot be smelled or masked by other odors. The danger of these is becoming increasingly apparent, especially in industrial plants, mines, well-sealed homes and office buildings, recreational and other vehicles and other environments in which people are present for long periods.

Recently, a solid state biomimetric sensor has been developed by the inventor of the present application which has an extended useful life and which mimics the human response to various toxic gases and vapors. As described in U.S. Pat. No. 5,063,164 this sensor comprises a porous, semi-transparent substrate with a self-regenerating chemical sensing reagent impregnated into the substrate. The Optical density of the chemical sensor changes in response to contact with the target gases. This patent describes a variety of sensing reagents and substrates.

The sensor has a relatively long useful lifetime, typically about three years, approximately equivalent to the useful life of typical alkaline battery. A gas detector system is also described in co-pending U.S. Pat. No. 5,280,273 issued to the present inventor on Jan. 18, 1994.

Other gas sensing compositions have been developed, such as those described by Shuler et al in U.S. Pat. No. 4,043,934. The disclosed sensing reagents are effective with certain gases, such as reducing gases like carbon monoxide, producing a color change upon exposure. These materials however, tend to have a short useful life, typically 2–4 months.

In order to apply these gas sensing materials in practical applications, such as commercial, industrial, home, recreational vehicle or other uses, compact, reliable, easily serviced sensing and alarm systems are needed. The system must provide accurate and reliable detection of optical transmission characteristics and/or color changes. Characteristics of certain sensor materials, such as variable response depending on ambient humidity, must be accommodated. Ease of servicing, e.g., replacement of the sensing material or cell and battery, battery pack or main power supply, is an important consideration where unskilled persons are maintaining the system.

In most cases, the gas detectors are most effective when fastened to the ceiling in an area where there is free air flow. The detector enclosure should be attractive, be convenient to service. Battery changing, sensor or sensing cell replacement and the like should be simple to accomplish without requiring special tools, ladders, etc. Thus, there is a continuing need for improved enclosures for single and multiple gas detectors that allow highly efficient detector operation, are easily serviced, clearly indicate the presence of toxic gases, clearly show when the battery or other power supply is missing and are attractively configured.

SUMMARY OF THE INVENTION

The above noted requirements, and others are met in accordance with this invention by an enclosure for a gas detector system that includes an easily removable and replaceable battery/sensor holder, a clearly recognizable target gas presence alarm for one or more gases and a readily apparent indicator showing absence of a battery/sensor holder and/or a low battery indicator.

The enclosure has one generally flat panel for mounting on a surface with the enclosure extending in a generally downwardly direction for a ceiling mount or outwardly for a wall mount and a second panel and connected thereto by a sidewall spaced from the first panel providing an interior volume for containing the gas detector apparatus. Typically, the enclosure is mounted on a ceiling using screws, double stick tape or any other suitable means. Where the detector includes a sound alarm, typically an audio speaker, an opening through the enclosure is provided for directing the sound out of the enclosure. The opening may be configured to spread the sound over a large area.

At least one light emitting means is provided on the enclosure surface to indicate that the detector system is operational.

An opening is provided in the second panel of the enclosure for receiving a generally cylindrical battery/sensor holder. The opening is preferably approximately perpendicular to the first panel so that it is downwardly extending when the enclosure is secured to a ceiling (or outwardly extending when secured to a wall) to permit easy access to the battery/sensor holder. The battery sensor holder has a generally cylindrical outer surface configured for insertion into the opening. At least one protrusion extends radially from the holder's outer surface and cooperates, in a bayonet manner, with a corresponding notch in the enclosure second panel adjacent to the opening. Thus, the holder is inserted into the opening with the protrusion aligned with the notched and rotated slightly to secure the holder in place. More than one cooperating set of protrusion and notch may be Used, typically up to four, for greater security.

At least one protrusion contains a gas detection or sensor cell positioned in an operative relationship between a light emitting source and a light detector or light detecting means when the protrusion is in the inserted, secured position. Alternatively, a reflector may be placed behind the sensor so that an LED and photodiode (light emitting means and light detecting means) may be mounted on a board on the same side of the sensor.

Some gas detection or sensor cells are sensitive to humidity levels. In areas where humidity varies widely, the use of two cells, each optimized for a different humidity level may be desirable. In that case, two (or more) of the protrusions may contain different detection or sensor cells optimized for different conditions.

In order to make the absence of the battery/sensor holder readily apparent to those in the vicinity of the enclosure, a flanged tube is provided in the enclosure opening. When the battery/sensor holder is in place, the tube is pushed into the enclosure. When the battery/sensor holder is removed, the tube drops down under the force of gravity to a position extending beyond the lower surface of the enclosure. If desired, a spring, elastic means or other device may be used to assure that the tube extends when the battery/sensor holder is removed. The surface of the tube is preferably brightly colored, such as by a brightly colored label attached to a neutral colored cylinder, to catch the eye of a person in the vicinity of the enclosure.

Where one protrusion is provided, the tube may have a slot through which the protrusion may pass, with the outer end of tube resting on a flange around the outer end of the battery/sensor holder. In either case, insertion of the battery/sensor holder will push the tube into the enclosure and out of sight.

A gripping arrangement, such as an extending cross bar, is preferably included on the outer end of the battery/sensor holder to permit the holder to be easily gripped by the fingers and turned for insertion and locking and for holder removal.

An outwardly extending flange is preferably included at the outer end of the battery/sensor holder, abutting the second surface of the enclosure, to cover the protrusion(s) and corresponding notch(es) arrangement when the battery/sensor holder is in place.

Any suitable toxic gas detector system may be housed in the enclosure of this invention. Particularly preferred toxic gas detection systems are described in my U.S. Pat. No. 5,280,273 granted Jan. 18, 1994, the disclosure which is hereby incorporated by reference.

BRIEF DESCRIPTION OF THE DRAWING

Details of the invention, and of preferred embodiments thereof, will be further understood upon reference to the drawing, wherein.

DETAILED DESCRIPTION OF THE PREFERRED EMBODIMENTS

Figures 1, 2:
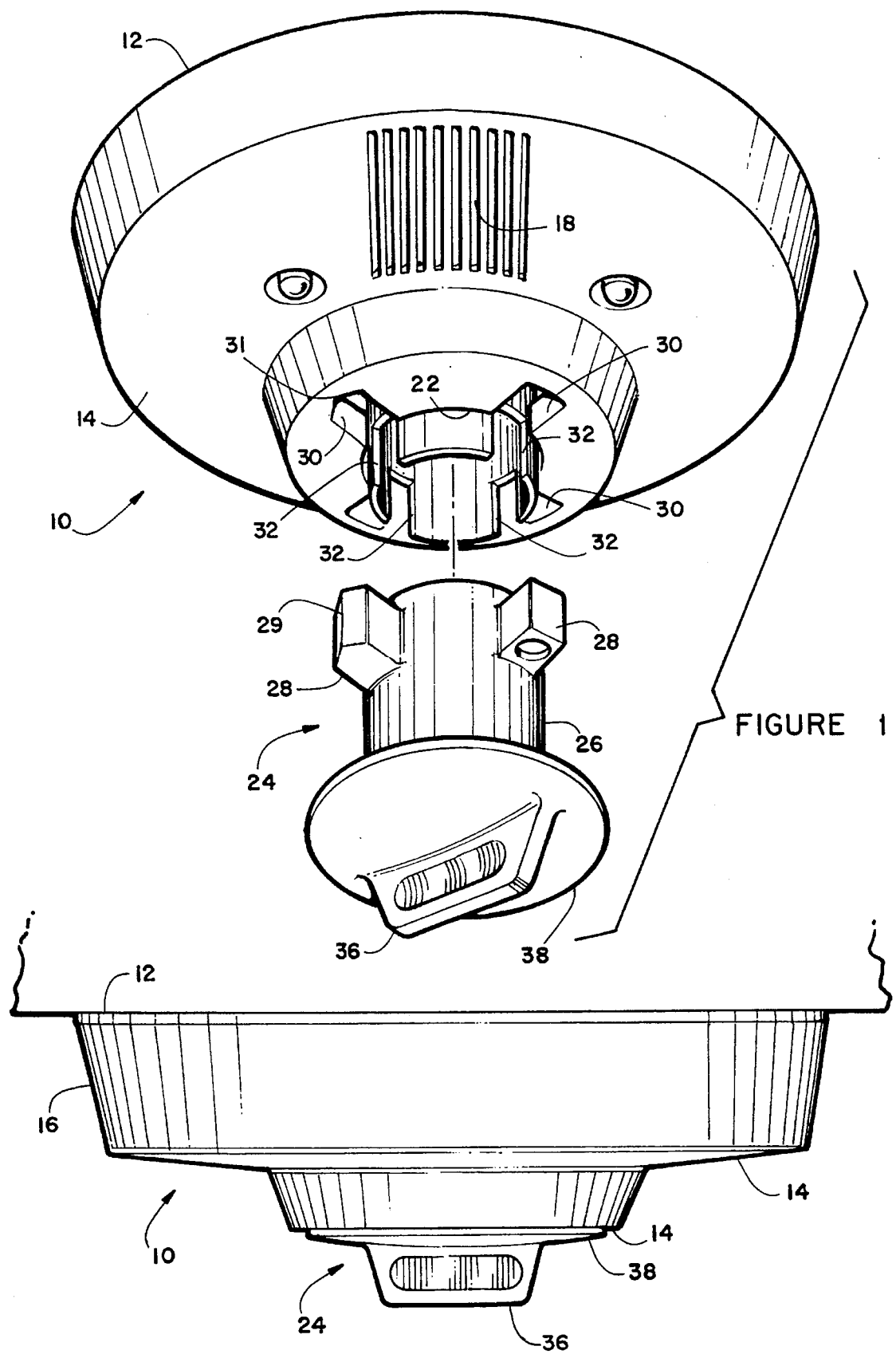
FIG. 1 is a perspective view of one embodiment of the toxic gas detector enclosure of this invention with the battery/sensor holder removed.
FIG. 2 is an elevation of the embodiment of FIG. 1 with the battery/sensor holder inserted and secured in place.

As seen in FIGS. 1 and 2, the first embodiment of the target gas or gases detector enclosure 10 has a generally flat first panel 12 and a second panel 14 spaced from the first panel with a sidewall 16. The space between the panels is sized to house the selected toxic gas detector system. The second panel may have any suitable configuration, including flat, rounded or having extended areas such as the extended central region shown.

Where the detector provides an audible alarm warning of the presence of one or more gases, such as through an audio speaker, a plurality of slots 18 are provided to allow the sound to exit the enclosure. The slots may be covered with a fine mesh to keep insects, dust and the like out of enclosure 10. The slots will also allow air flow into the enclosure to the gas detector sensor.

A pair of light emitting means 20, such as light emitting diodes (LED), are provided to indicate the presence of any target gas or several gases. Typically, one LED may be yellow and indicate a low level of the gas and the other red to indicate a higher level. The audible alarm may be set to sound at a still higher level, or at either the low or the moderate level, as desired.

An opening 22 is provided in second panel 14 of enclosure 10, the axis of which is preferably generally perpendicular to first panel 12. A battery/sensor holder 24, having a generally cylindrical wall 26 configured to enter into opening 22, holds a suitable battery, such as a conventional C or D cell having a bottom contact and a central top contact. A plurality of protrusions 28, in this embodiment four, extend outwardly of the holder wall near the inner end thereof. A corresponding plurality of notches 30 are formed in second panel 14 to receive protrusions 28. Battery/sensor holder 24 is inserted and rotated to lock the holder in place in a "bayonet" manner. One of the protrusions 28 has a bevel-like face 29 for keyed reception in notch opening area 31.

Figure 3:
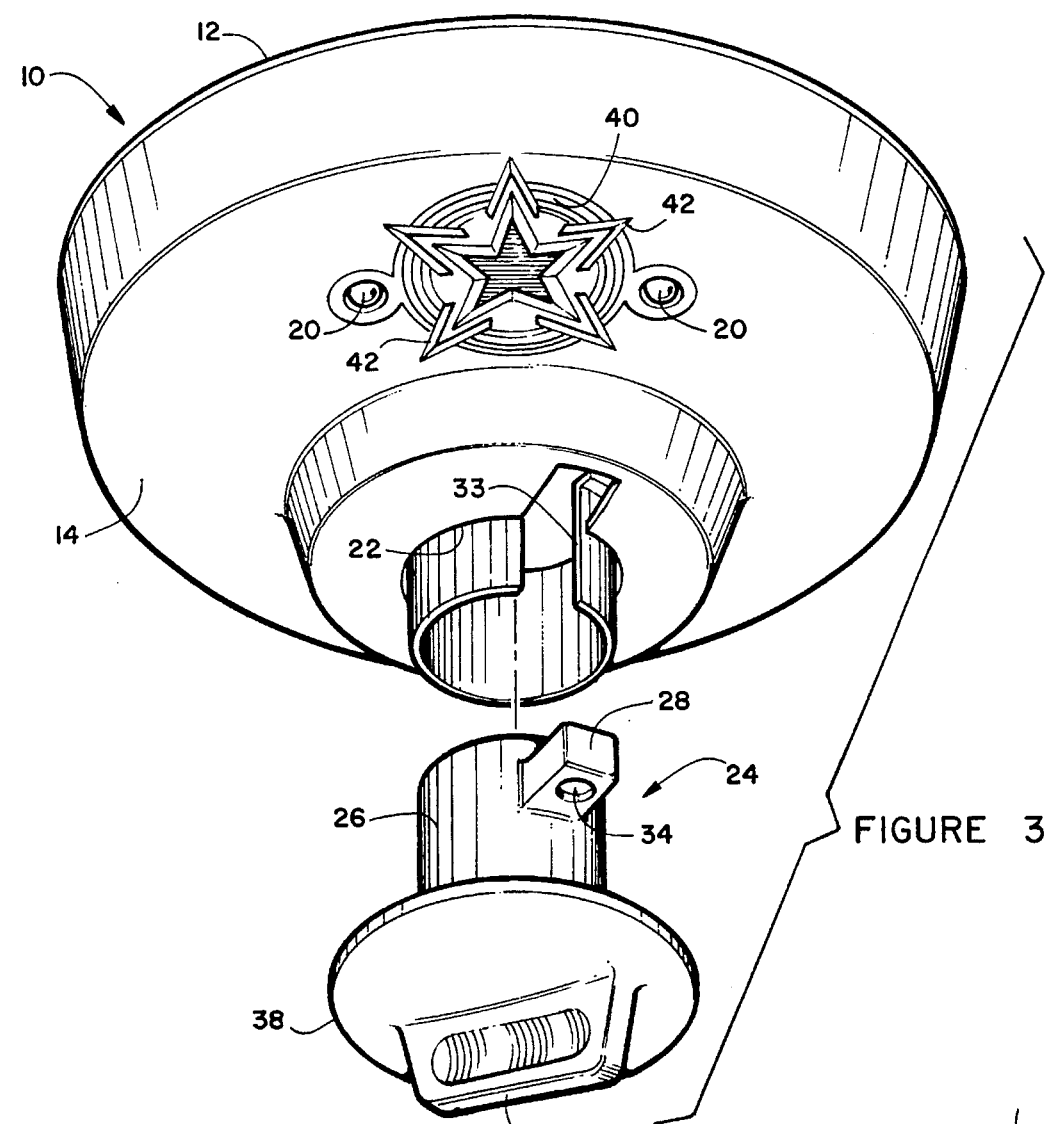
FIG. 3 is a perspective view of a second embodiment of the toxic gas detector enclosure of this invention with the battery/sensor holder removed.
Figure 4:
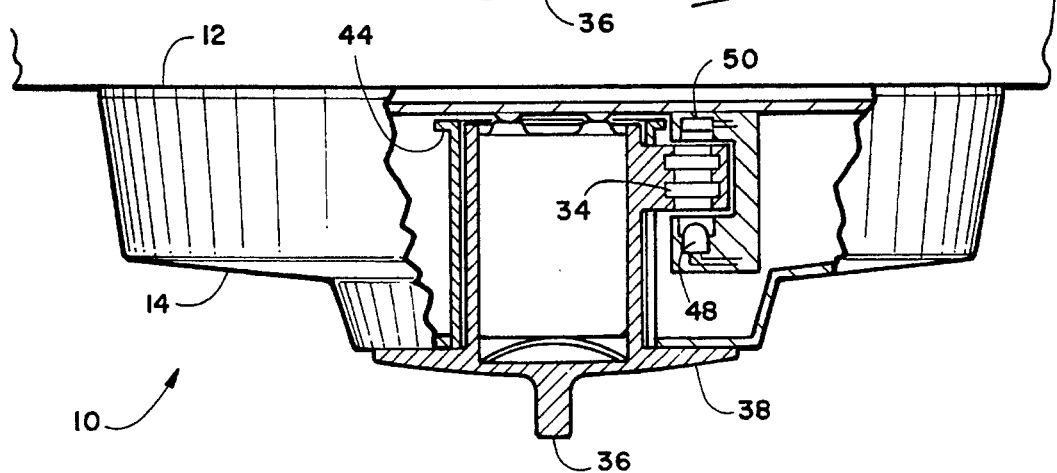
FIG. 4 is a partially cut away elevation of the embodiment of FIG. 3 with the battery/sensor holder inserted and secured in place.

A loose, axially slidable, tube 32 having an outward narrowed flange (not seen, but similar to flange 44 as seen in FIG. 4) to retain the tube end within enclosure 10 extends outwardly as seen in FIG. 1 by the force of gravity. The surface of tube 32 is brightly colored or bears indicia indicating that battery/sensor holder 24 has been removed, warning anyone in the vicinity that the toxic gas detector is not powered. When battery holder 24 is inserted into opening 22, the outer edge of tube 32 will engage the end of the battery/sensor holder or the protrusions 28 and be pushed up into enclosure 10. Because of limited space within enclosure 10, in the embodiment shown tube 32 must necessarily be fairly short. If a longer tube 32 is desired, to increase the warning area when the tube is extended, slots similar to slot 33 in FIG. 3 may be formed in tube 32 adjacent to each protrusion 28, so that the battery/sensor holder 24 can slip up inside tube 32 with the outer tube end resting on the inner side of flange 38.

One of the protrusions 28 houses a gas sensor cell 34, of the sort described in detail below. A handle 36 for gripping with the fingers is provided at the end of battery/sensor holder 24 for ease of rotating and removing and reinserting the holder. Many persons will be able to easily grip this handle 36 on a ceiling mounted enclosure 10. A flange 38 extends outwardly of tube 26 between the tube and handle 36 to cover slots 30 when the tube is inserted and secured in place.

A second embodiment of the toxic gas detector enclosure is shown in FIGS. 3 and 4. As before, enclosure 10 includes a flat first panel 12 and a spaced second panel 14, connected by a sidewall 16 for enclosing a toxic gas detector.

Where an audible alarm is included, such as an audio speaker, an opening 40 is included, which may be covered with a mesh to keep out insects and the like. Opening 40 also will permit entry and egress of air to the toxic gas sensing apparatus. Here, opening 40 has a star shape, with star-shaped grooves in panel 14 extending outwardly and generally parallel to the points 42 of star-shaped opening 40. I have found that this multi-pointed opening and the associated grooves significantly aid in spreading sound emitted through opening 40 over a wider area.

A pair of light emitting means 20, typically a yellow and a red LED, are preferably provided to indicate two levels of gas, as described above.

An opening 22 is provided in second panel 14 for receiving battery/sensor holder 24 having a generally cylindrical wall 26. In this embodiment, only a single protrusion 28 and cooperating notch 30 is provided. A tube 32, slidable in opening 22, is retained in the extended position by a flange 44, as seen in FIG. 4. Battery/sensor holder 24 includes a flange 38 and handle 36 of the sort described above.

A gas sensing cell 34 is provided in and opening though protrusion 28. As seen in FIG. 4, when battery/sensor holder 24 is inserted and rotated to the secured position, cell 34 moves into position between a light emitter 48, such as a light emitting diode, and a sensor or light detecting means 50. These light emitters and sensors or detectors are of the sort used in a gas sensing system as described in my U.S. Pat. No. 5,280,273. All the disclosure of the aforementioned U.S. Pat. No. 5,280,273 is incorporated herein by reference as stated herinbefore. More specifically, U.S. Pat. No. 5,280, 273 teaches in the abstract thereof "When fully inserted, the drawer positions the cell between the emitter and detector and brings battery contacts into connection with contacts for the light emitter and alarm". In a similar manner, in the subject invention, the means for making electrical contact between the battery/sensor holder and the light emitting means and the light detecting means upon insertion and securing of the battery/sensor holder within the opening is provided as taught in the aforementioned disclosure incorporated by reference.

Thus, the enclosure shown is attractive, convenient and highly effective.

While certain preferred materials, dimensions and arrangements have been detailed in conjunction with the above description of preferred embodiments, those can be varied, where suitable, with similar results. Other applications, variations and ramifications of this invention will occur to those skilled in the art upon reading this disclosure. Those are intended to be included within the scope of this invention as defined in the appended claims.

I claim:

1. A gas detection system comprising:

a first flat panel for mounting said enclosure on a flat surface in an outwardly extending direction;

a second panel connected to said first panel by a sidewall thereby forming an enclosed space between said first and said second panels;

a light emitting means and a light detecting means fixedly mounted within said enclosed space;

a generally cylindrical battery/sensor holder;

an opening in said second panel wherein said battery/sensor holder is configured to be insertable into said opening;

means for releasably securing said batter/sensor holder in said opening;

means for making electrical contact between said battery/sensor holder and said light emitting means and said light detecting means upon insertion and securing of said battery/sensor holder within said opening;

a gas sensor cell carried by said holder; and, means for aligning said gas sensor cell between said light emitting means and said light detecting means upon insertion and securing of said battery/sensor holder within said opening.

2. A gas detection system as recited in claim 1 further comprising means for allowing sound generated within the enclosure to escape and outside air to enter into said enclosure.

3. A gas detection system as recited in claim 2 further comprising means for visually indicating the absence of the battery/sensor holder.

4. A gas detection system as recited in claim 1 wherein said means for releasably securing said battery/sensor holder comprises:

at least one radially extending protrusion on said battery/sensor holder;

at least one corresponding notch in said second panel adjacent to said opening, which upon insertion of the battery/sensor holder into said opening, forms a bayonet fitting between said protrusion and said notch thereby releasably securing said battery/sensor holder in said opening.

5. A gas detection system as recited in claim 4 wherein said radially extending protrusion contains at least one gas detection cell positioned so that upon securing of said battery/sensor holder into said opening, said gas detection cell is aligned between said light emitting means and said light detecting means.

6. A gas detection system as recited in claim 1 wherein said means for making electrical contact between said battery/sensor holder and said light emitting means and said light detecting means comprises:

at least one positive and one negative electrical contacts on said battery/sensor holder;

a corresponding set of positive and negative terminals connected to said light emitting means and said light detecting means and positioned so that upon releasably securing said battery/sensor holder in said opening, electrical contact is made between said battery/sensor holder and said light emitting means and said light detecting means.

7. A gas detection system as recited in claim 2 wherein said means for allowing sound to escape and outside air to enter into said enclosed space comprises at least one opening in said second panel that is sufficient in size to function as a sound outlet and a air inlet.

8. A gas detection system as recited in claim 3 wherein said means for visually indicating the absence of the battery/sensor holder comprises:

a slidably mounted indicating tube that is coaxial with said opening; and, means for retaining one end of said indicating tube within said enclosure upon removal of said battery/sensor holder.

9. A gas detection system as recited in claim 8 wherein said means for visually indicating the absence of the battery/sensor holder further comprises:

elastic means for urging said indicating tube out of said enclosure when said battery/sensor holder is not present.

10. A gas detection system as recited in claim 1 further comprising at least one light emitting means for indicating the presence of a target gas.

11. A gas detection system as recited in claim 1 further comprising at least two light emitting means, one for indicating a predetermined relatively low level of a target gas, and the second for indicating a predetermined relatively high level of target gas.

12. A gas detection system as recited in claim 1 wherein said battery/sensor holder has an externally mounted handle for grasping said battery/sensor holder, for inserting said holder into said opening and for rotating said holder to secure said battery/sensor holder in said opening.

13. A generally cylindrical battery/sensor holder configured and adapted to be inserted into an opening in the enclosure of a gas detection system, said holder comprising:

a generally cylindrical wall having an outer diameter less than the inner diameter of the opening;

at least one radial protrusion extending from said generally cylindrical wall and being positioned to pass through a corresponding notch in the surface of the enclosure adjacent to the opening, said protrusion being further positioned such that upon insertion of said battery/sensor holder into the enclosure opening and upon rotation therein, said holder is releasably secured;

a battery, said battery being housed in said holder;

a gas sensor cell, said sensor cell being housed in said holder and positioned so that upon releasably securing said battery/sensor holder in the enclosure opening, said gas sensor cell is optically aligned between a light emitting means and a light detecting means within the enclosure of the system; and, at least one positive and one negative electrical contact positioned on said holder so that upon releasably securing said holder in the enclosure, electrical contact is made between said battery and the gas detection system.

14. A battery/sensor holder as recited in claim 13 further comprising:

an outwardly extending flange on the outer end of said generally cylindrical wall, said flange being positioned and configured such that upon releasably securing said battery/sensor holder in the enclosure of a gas detection system, said flange abuts the surface of the enclosure and covers the notch adjacent to the enclosure opening.

15. A battery/sensor holder as recited in claim 13 wherein said gas sensor cell is housed within said radial protrusion extending from said generally cylindrical wall.

16. A battery/sensor holder as recited in claim 14 further comprising:

a handle configured to be gripped by a user's fingers, said handle being fixedly mounted on the outer end of said cylindrical wall and being positioned to aid the user in the insertion, rotation and releasable securing of said battery/sensor holder within the enclosure opening.

\* \* \* \* \*